United States Patent
Takamoto

(10) Patent No.: US 12,067,162 B2
(45) Date of Patent: Aug. 20, 2024

(54) GAZE POINT DETECTION DEVICE AND GAZE POINT DETECTION METHOD

(71) Applicant: NEC Corporation, Tokyo (JP)

(72) Inventor: Makoto Takamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 426 days.

(21) Appl. No.: 17/623,718

(22) PCT Filed: Jul. 10, 2019

(86) PCT No.: PCT/JP2019/027305
§ 371 (c)(1),
(2) Date: Dec. 29, 2021

(87) PCT Pub. No.: WO2021/005742
PCT Pub. Date: Jan. 14, 2021

(65) Prior Publication Data
US 2022/0244779 A1 Aug. 4, 2022

(51) Int. Cl.
*G06V 40/16* (2022.01)
*G06F 3/01* (2006.01)
(Continued)

(52) U.S. Cl.
CPC ............... *G06F 3/013* (2013.01); *G06T 7/70* (2017.01); *G06T 7/97* (2017.01); *G06V 40/161* (2022.01); *G06T 2207/30201* (2013.01)

(58) Field of Classification Search
CPC .............. G06V 40/16–197; G06T 7/97; G06T 7/70–75; G06F 3/013
See application file for complete search history.

(56) References Cited

U.S. PATENT DOCUMENTS 9,437,038 B1 * 9/2016 Costello .................. G06T 15/20
10,871,823 B1 * 12/2020 Burgess .................. G06T 7/246
(Continued)

FOREIGN PATENT DOCUMENTS

| JP | 2011-217202 A | 10/2011 |
| JP | 2015-032237 A | 2/2015 |
| JP | 2017-538990 A | 12/2017 |

OTHER PUBLICATIONS

International Search Report for PCT Application No. PCT/JP2019/027305, mailed on Sep. 24, 2019.
(Continued)

*Primary Examiner* — Sean T Motsinger
(74) *Attorney, Agent, or Firm* — Sughrue Mion, PLLC

(57) ABSTRACT

A gaze point detection device 30 includes face detection means 31 for detecting a face portion of an object person from a first image and first depth information, line of sight direction estimation means 32 for estimating a line of sight direction of the object person using the face portion detected by the face detecting means 31, position information estimation means 33 for estimating a three-dimensional spatial position of a pupil of the object person and three-dimensional spatial positions of a first photographing unit and a second photographing unit, based on the first image, the first depth information, a second image and second depth information, and gaze point identification means 34 for identifying a gaze point of the object person, based on the three-dimensional spatial position of the pupil of the object person and the line of sight direction.

13 Claims, 9 Drawing Sheets

(51) Int. Cl.
  *G06T 7/00*    (2017.01)
  *G06T 7/70*    (2017.01)

(56)     References Cited

U.S. PATENT DOCUMENTS

| | | | |
|---|---|---|---|
| 2013/0188054 A1 | 7/2013 | Weinblatt | |
| 2014/0146148 A1* | 5/2014 | Maciocci | G06F 3/013 |
| | | | 348/59 |
| 2015/0287206 A1* | 10/2015 | Ebisawa | G06T 7/593 |
| | | | 382/154 |
| 2016/0098862 A1* | 4/2016 | Wilson | H04N 9/3147 |
| | | | 345/419 |
| 2016/0125241 A1* | 5/2016 | Ebisawa | G06T 7/77 |
| | | | 348/78 |
| 2016/0299360 A1* | 10/2016 | Fonte | G02C 7/027 |
| 2018/0070816 A1* | 3/2018 | Byrns | G06V 40/19 |
| 2018/0081434 A1* | 3/2018 | Siddiqui | G06V 40/20 |
| 2019/0156100 A1* | 5/2019 | Rougeaux | G06F 3/013 |
| 2019/0172222 A1* | 6/2019 | Ebisawa | G06T 7/593 |
| 2020/0081260 A1* | 3/2020 | Lochner | G02B 27/017 |
| 2020/0258255 A1* | 8/2020 | Aleem | G06T 7/536 |
| 2021/0165993 A1* | 6/2021 | Wang | G06N 3/08 |
| 2022/0244779 A1* | 8/2022 | Takamoto | G06V 40/161 |
| 2022/0313082 A1* | 10/2022 | Andersson | G06F 3/013 |

OTHER PUBLICATIONS

English translation of Written opinion for PCT Application No. PCT/JP2019/027305, mailed on Sep. 24, 2019.

* cited by examiner

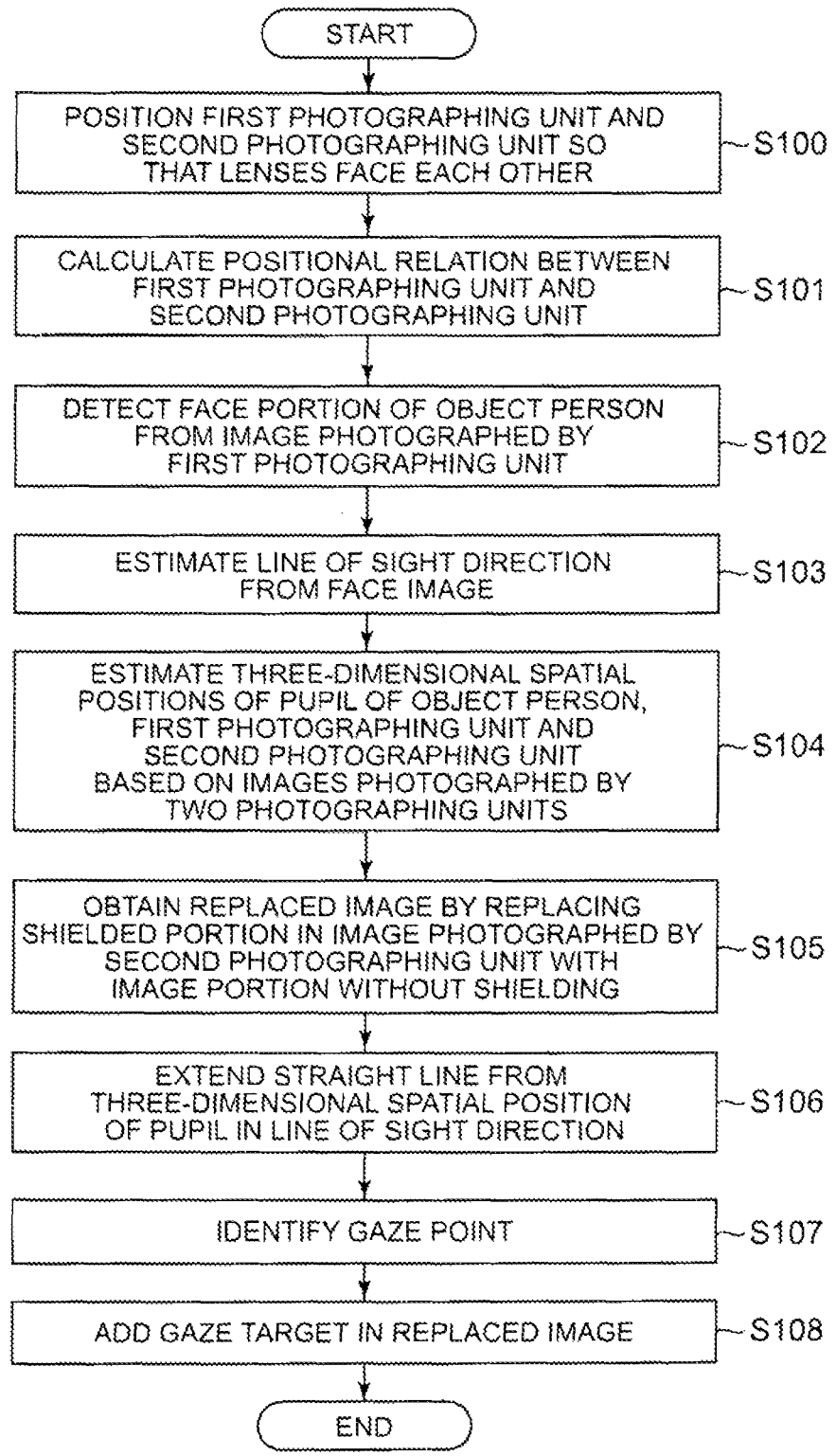

GAZE POINT DETECTION DEVICE AND GAZE POINT DETECTION METHOD

This application is a National Stage Entry of PCT/JP2019/027305 filed on Jul. 10, 2019, the contents of all of which are incorporated herein by reference, in their entirety.

TECHNICAL FIELD

The present invention relates to a gaze point detection device and a gaze point detection method for detecting a target to which a person is gazing.

BACKGROUND ART

Gaze point detection technology, which uses gaze information to estimate the products in which a customer is interested, has been gathering attention. A gaze point detection device based on gaze point detection technology comprises one or more cameras that estimate the position and line of sight direction of an object person for gaze point detection. The position of the object person is estimated using a geometric method from an image photographed and recorded by the camera. Alternatively, the position of the object person is estimated using a position estimation detector. The line of sight direction is estimated using a line of sight detector. Then, the attention point of the object person is estimated by detecting the object ahead of the line of sight direction.

For example, patent literature 1 describes a device for detecting a gaze point. The device described in patent literature 1 detects a gaze point using a single camera for capturing an object person and a line of sight direction detection means.

CITATION LIST

Patent Literature

PTL 1: Japanese Patent Laid-Open No. 2011-217202

SUMMARY OF INVENTION

Technical Problem

However, the device described in patent literature 1 cannot strictly measure a spatial position of a pupil of the object person which is the origin, a size of the pupil, and a depth of an image. Therefore, although the device described in patent literature 1 can obtain an angle of the line of sight direction of the object person, it cannot accurately detect a gaze point.

It is an object of the present invention to provide a gaze point detection system capable of accurately detecting a gaze point.

Solution to Problem

A gaze point detection device according to the present invention inputs a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, wherein the gaze point detection device includes face detection means for detecting a face portion of an object person from the first image and the first depth information, line of sight direction estimation means for estimating a line of sight direction of the object person using the face portion detected by the face detecting means, position information estimation means for estimating a three-dimensional spatial position of a pupil of the object person and three-dimensional spatial positions of the first photographing unit and the second photographing unit, based on the first image, the first depth information, the second image and the second depth information, and gaze point identification means for identifying a gaze point of the object person, based on the three-dimensional spatial position of the pupil of the object person and the line of sight direction.

A gaze point detection method according to the present invention includes inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, detecting a face portion of an object person from the first image and the first depth information, estimating a line of sight direction of the object person using the face detected portion, estimating a three-dimensional spatial position of a pupil of the object person and three-dimensional spatial positions of the first photographing unit and the second photographing unit, based on the first image, the first depth information, the second image and the second depth information, and identifying a gaze point of the object person, based on the three-dimensional spatial position of the pupil of the object person and the line of sight direction.

A gaze point detection program according to the present invention causes a computer to execute a process of inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, a process of detecting a face portion of an object person from the first image and the first depth information, a process of estimating a line of sight direction of the object person using the detected face portion, a process of estimating a three-dimensional spatial position of a pupil of the object person and three-dimensional spatial positions of the first photographing unit and the second photographing unit, based on the first image, the first depth information, the second image and the second depth information, and a process of identifying a gaze point of the object person, based on the three-dimensional spatial position of the pupil of the object person and the line of sight direction.

Advantageous Effects of Invention

According to the present invention, it is possible to accurately detecting a gaze point with improving accuracy of spatial position information of an object person.

BRIEF DESCRIPTION OF DRAWINGS

FIG. 5 It depicts a flowchart showing an operation of the gaze point detection device of the first example embodiment.

DESCRIPTION OF EMBODIMENTS

Hereinafter, example embodiments of the present invention are described with reference to the drawings.

Example Embodiment 1

Figure 1:
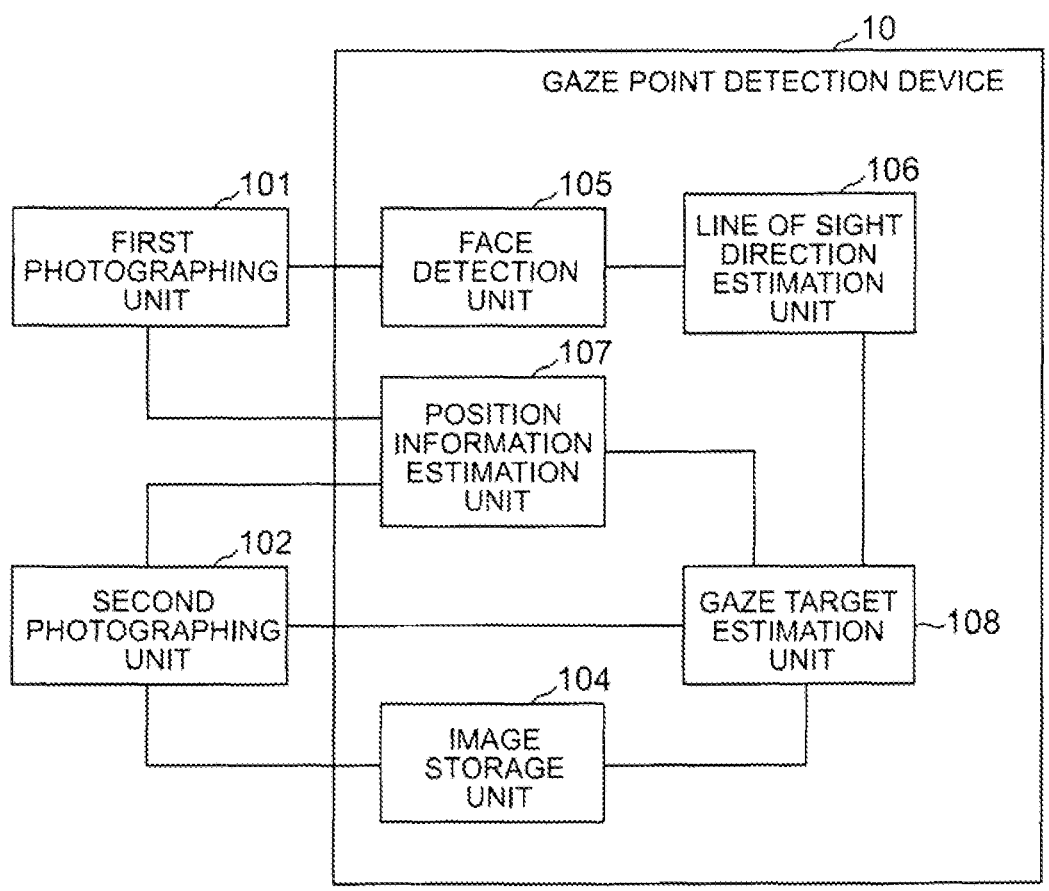
FIG. 1 It depicts a block diagram showing a configuration example of the gaze point detection device of the first example embodiment.

FIG. 1 is a block diagram showing a gaze point detection device 10 of the first example embodiment together with a first photographing unit 101 and a second photographing unit 102. The gaze point detection device 10 includes an image storage unit 104, a face detection unit 105, a line of sight direction estimation unit 106, a position information estimation unit 107, and a gaze target estimation unit 108.

A depth camera is used as the first photographing unit 101 and the second photographing unit 102, respectively. In this specification, a depth camera means photographing means capable of obtaining distance information (depth information) as well as an RGB image (two-dimensional image). Hereafter, such a depth camera is referred to as an RGB-D camera. As the first photographing unit 101 and the second photographing unit 102, for example, Intel RealSense (registered trademark) can be used.

As a depth camera, a combination of a camera that obtains RGB images and a ToF (Time of Flight) camera may be used.

The first photographing unit 101 is installed at a position such that a front side of an object person can be photographed when the object person is gazing at a certain object. The first photographing unit 101 is adjusted to a sufficient height or angle to allow the face of the person to be included in the image. Similarly, the second photographing unit 102 is installed so that the gaze portion to be detected, behind the first photographing unit 101, is included in the image. Further, the first photographing unit 101 and the second photographing unit 102 are installed so that no permanent obstructions or other objects include the photographed image.

Figure 2:
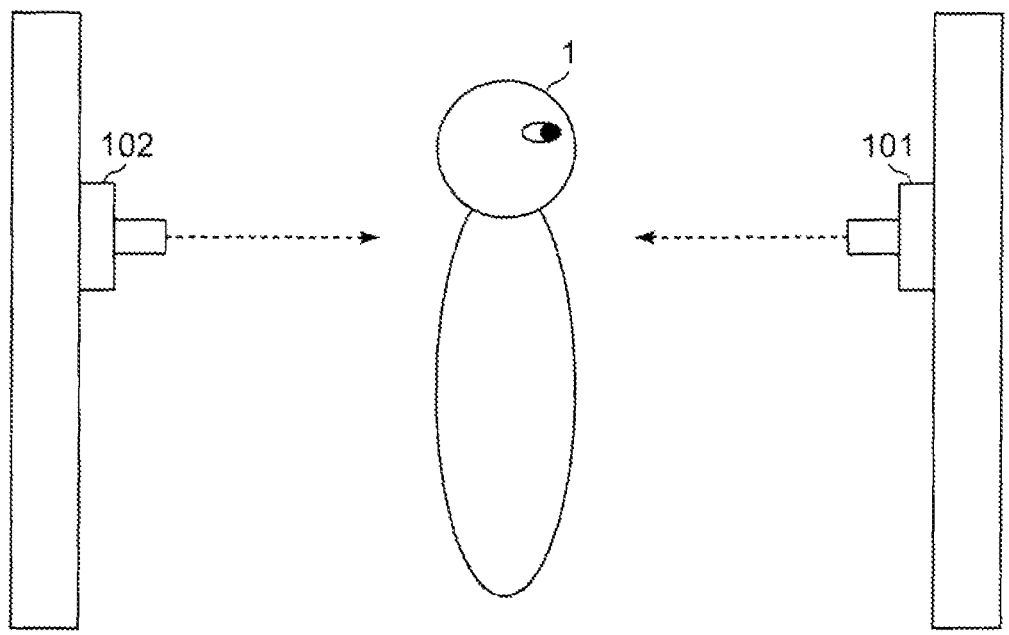
FIG. 2 It depicts an explanatory diagram showing a position example of a first photographing unit and a second photographing unit.

FIG. 2 shows a position example of the first photographing unit 101 and the second photographing unit 102. The first photographing unit 101 is installed so that the object person 1 and the second photographing unit 102 are within an image obtained by the first photographing unit 101. The second photographing unit 102 is installed so that the object person 1 and the first photographing unit 101 are within an image obtained by the second photographing unit 102. In general, the first photographing unit 101 and the second photographing unit 102 are positioned so as to face each other.

In the gaze point detection device 10, the line of sight direction of the object person 1 is estimated from an image in which the front of the object person 1 is photographed by the first photographing unit 101. In addition, the target to be gazed at by the object person 1 is identified from an image of the back of the object person 1 and a candidate target to be gazed at by the object person 1 photographed by the second photographing unit 102.

Since the first photographing unit 101 and the second photographing unit 102 work together, i.e., the target gazed at by the object person 1 is identified based on both the image photographed by the first photographing unit 101 and the image photographed by the second photographing unit 102, the coordinates in the image photographed by the first photographing unit 101 and the coordinates in the image photographed by the second photographing unit 102 are required to be the same.

The first photographing unit 101 obtains an image (a two-dimensional image) including at least a portion of a face of the object person and the second photographing unit 102, and depth information. The second photographing unit 102 obtains an image including the object person, the first photographing unit 101 and a gaze target of the object person, and depth information. The image storage unit 104 records (stores) the image information photographed by the second photographing unit 102 and the depth information.

The face detection unit 105 detects the face of the object person from the image photographed by the first photographing unit 101. The line of sight direction estimation unit 106 estimates a line of sight direction from the face image detected by the face detection unit 105.

The position information estimation unit 107 estimates spatial positions (three-dimensional spatial positions) of the object person, the first photographing unit 101, and the second photographing unit 102 from the images photographed by the first photographing unit 101 and the second photographing unit 102 and the depth information.

The gaze target estimation unit 108 estimates a gaze target using the gaze information obtained by the line of sight direction estimation unit 106 and the spatial positions obtained by the position information estimation unit 107. The gaze target estimation unit 108 adds the gaze target to the image of the second photographing unit 102 in which the shielded portion is removed using the past image recorded in the image storage unit 104. Details of the past image and the shielded portion will be described later.

Figure 3A:
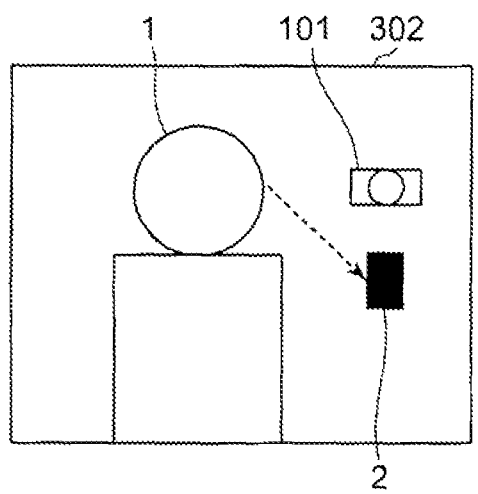
FIG. 3A It depicts an explanatory diagram showing an example of an image photographed by a second photographing unit.
Figure 3B:
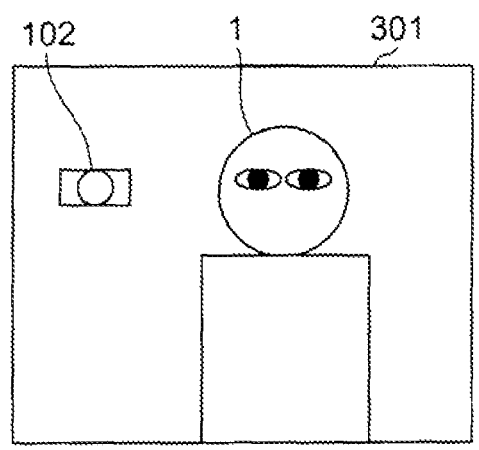
FIG. 3B It depicts an explanatory diagram showing an example of an image photographed by a first photographing unit.

FIGS. 3A and 3B are explanatory diagrams showing an example of images photographed by the first photographing unit 101 and the second photographing unit 102. FIG. 3A shows an example of an image 302 photographed by the second photographing unit 102. FIG. 3B shows an example of an image 301 photographed by the first photographing unit 101. In the example shown in FIGS. 3A and 3B, the image 301 is an image in which the front side of the object person 1 and the second photographing unit 102 are photographed. In addition, the image 302 is an image in which the back side of the object person 1, the first photographing unit 101, and the gaze target 2 are photographed.

Figure 4A:
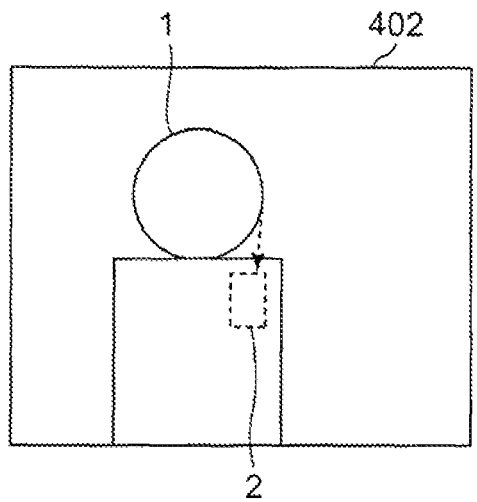
FIG. 4A It depicts an explanatory diagram showing how the shielded portion is restored using images photographed in the past by a second photographing unit.
Figure 4B:
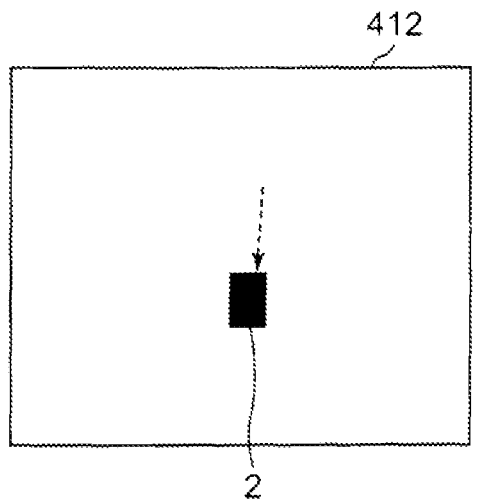
FIG. 4B It depicts an explanatory diagram showing how the shielded portion is restored using images photographed in the past by a second photographing unit.

FIGS. 4A and 4B are explanatory diagrams showing how the shielded portion is restored using an image photographed in the past by the second photographing unit 102. FIG. 4A shows an example of an image 402 photographed by the second photographing unit 102. FIG. 4B shows an example of an image 412 including an image of the gaze target 2. In FIG. 4A, the image of the first photographing unit 101 is omitted.

Assuming that the gaze point detection device 10 is applied to a retail store, the first photographing unit 101 is, for example, installed at a customer aisle side in a product display shelf. The second photographing unit 102 is, for example, installed across the customer aisle from the product display shelf on which the first photographing unit 101 is installed. In such an installation situation, it is conceivable that the object person 1 (in the present example, a customer) may shield the gaze target 2 and may not appear in the image obtained by the second photographing unit 102 (refer to FIG. 4A).

In the present example embodiment, the gaze point detection device 10 also controls so that the image of the gaze target 2 appears in the image 412 even in such a case.

Next, the operation of the gaze point detection device 10 will be described. FIG. 5 is a flowchart showing an operation of the gaze point detection device 10.

The first photographing unit 101 and the second photographing unit 102 in the gaze point detection device 10 are positioned so as to face each other (step S100).

In that state, the first photographing unit 101 photographs an image including a face portion of the object person. The position information estimation unit 107 first calculates a positional relation between the first photographing unit 101 and the second photographing unit 102 (step S101). The processing of step S101 is executed, for example, as follows.

The position information estimation unit 107 obtains the position (three-dimensional spatial position) of the second photographing unit 102 from the image photographed by the first photographing unit 101 and depth information. The gaze target estimation unit 108 obtains the position of the first photographing unit 101 from the image photographed by the second photographing unit 102 and the depth information. The position information estimation unit 107 obtains a position vector of the first photographing unit 101 having the position of the second photographing unit 102 based on the image photographed by the first photographing unit 101 and the depth information as the origin. The position information estimation unit 107 also obtains a position vector of the second photographing unit 102 having the position of the first photographing unit 101 based on the image photographed by the second photographing unit 102 and the depth information as the origin.

Ideally, the magnitudes, i.e., distances of the two position vectors match. If they do not match, then the two position vectors are normalized by the average of the magnitudes of the two position vectors.

The gaze target estimation unit 108 calculates the rotation matrix R based on the following equation (1).

$$r_{14} = R * r_{41} \qquad (1)$$

$r_{14}$ indicates the position of the second photographing unit 102 based on the image photographed by the first photographing unit 101 and the depth information when the position of the first photographing unit 101 is the origin. $r_{41}$ indicates the position of the first photographing unit 101 based on the image photographed by the second photographing unit 102 and the depth information when the position of the second photographing unit 102 is the origin. The parameters of the rotation matrix R are three. If Euler matrix or the like is assumed, the rotation matrix R can be obtained exactly by solving a nonlinear simultaneous equation. The accuracy of the numerical solution of the nonlinear simultaneous equation increases as the number of parameters is reduced. Therefore, the accuracy of the numerical solution can be improved if a part of the rotation angle is obtained in another way by identifying in advance a line horizontal to the ground, a vertical line, three-dimensional spatial positions of the first photographing unit 101 and the second photographing unit 102, and the like (for example, assuming that the gaze point detection device 10 is applied to a store, positioning the tiers of a product display shelf so that they are horizontal to the ground or making the appearance of the product display shelf a rectangular one).

The gaze target estimation unit 108 obtains an intersection point between a line of sight direction extending from a three-dimensional spatial position of the pupil and a lens plane (a plane with z (optical axis direction)=0: when assuming that the first photographing unit 101 is a camera) of the first photographing unit 101. The gaze target estimation unit 108 can transform the coordinate system of the first photographing unit 101 into the coordinate system of the second photographing unit 102 by applying the rotation matrix R to the lens plane of the first photographing unit 101.

The processing of step S101 may be executed every time the process of detecting a target to be gazed at by the object person 1 is executed. The processing may be executed periodically (for example, once a day). The processing may be executed when the first photographing unit 101 and the second photographing unit 102 are installed.

The face detection unit 105 detects a face portion of the object person from the image photographed by the first photographing unit 101 (step S102). The face detection unit 105 can use, for example, a face detection function of OpenCV when detecting the face portion.

The line of sight direction estimation unit 106 estimates the line of sight direction based on the face image detected by the face detection unit 105 (step S103). When estimating the line of sight direction, the line of sight direction estimation unit 106 can, for example, use a corneal reflection method. In the case of using the corneal reflection method, an infrared light source or a near-infrared light source is used in combination.

The position information estimation unit 107 estimates the three-dimensional spatial positions of the pupil of the object person 1, the first photographing unit 101 and the second photographing unit 102 from the images photographed by the first photographing unit 101 and the second photographing unit 102 and the depth information (step S104). When estimating the position of the pupil, the position information of the pupil can be obtained geometrically by, for example, detecting the position of the pupil in the image using the Facemark API of OpenCV and performing an internal calibration of the depth camera in the first photographing unit 101.

In the image storage unit 104, images (past images) photographed by the second photographing unit 102 in a situation where the object person 1 is not present are recorded.

The position information estimation unit 107 replaces the portion of an object that shields the gaze target 2 in the current image (i.e., the image in which the object person 1 is photographed) photographed by the second photographing unit 102 with the corresponding portion in the past image (step S105). Note that the object that shields the gaze target 2 is mainly the object person 1. The image in which the shielded portion is replaced by the corresponding portion in the past image (the image in which the corresponding portion is replaced in the current image photographed by the second photographing unit 102) is hereinafter referred to as the replaced image. The past image is an image photographed by the second photographing unit 102 in the absence of a shielding object such as the object person 1.

The gaze target estimation unit 108 detects a gaze target using the line of sight direction estimated by the line of sight direction estimation unit 106 and the information of the spatial positions estimated by the position information estimation unit 107. The gaze target estimation unit 108, for example, extends a straight line from the three-dimensional spatial position of the pupil in the line of sight direction (step S106). When the straight line intersects some object in the replaced image, the gaze target estimation unit 108 determines that the object is the gaze target (step S107).

By using the past image, the gaze target estimation unit 108 can identify the gaze target 2 without the gaze target 2 being hidden by the object person 1 even when the gaze target 2 is shielded by the object person 1 in the current image (i.e., an image in which the object person 1 is photographed) photographed by the second photographing unit 102.

Then, the gaze target estimation unit 108 adds the gaze target in the replaced image (step S108: refer to FIG. 4B).

The gaze target estimation unit 108 plots the coordinate values in the coordinate system of the second photographing unit 102 on the image photographed by the second photographing unit 102.

If a display device is connected to the gaze point detection device 10, the gaze target estimation unit 108 may display an image in which the gaze target of the object person is displayed on the display device.

In the present example embodiment, since the first photographing unit 101 and the second photographing unit 102 obtain depth information, it is possible to estimate the position of the gaze target 2 more accurately than when estimating the depth information from a single image. In addition, the noise of the depth information can be canceled out by combining the depth information obtained by the plurality of photographing units (the first photographing unit 101 and the second photographing unit 102) (for example, by taking an average of the magnitudes of two position vectors between the first photographing unit 101 and the second photographing unit 102).

In addition, since the present example embodiment utilizes two photographing units sandwiching the object person 1, it is possible to detect the position of the gaze target 2, which cannot be detected when a single camera is used.

Furthermore, since a replaced image is used, the position of the gaze target 2 can be estimated even when the gaze target 2 is shielded.

Example Embodiment 2

Figure 6:
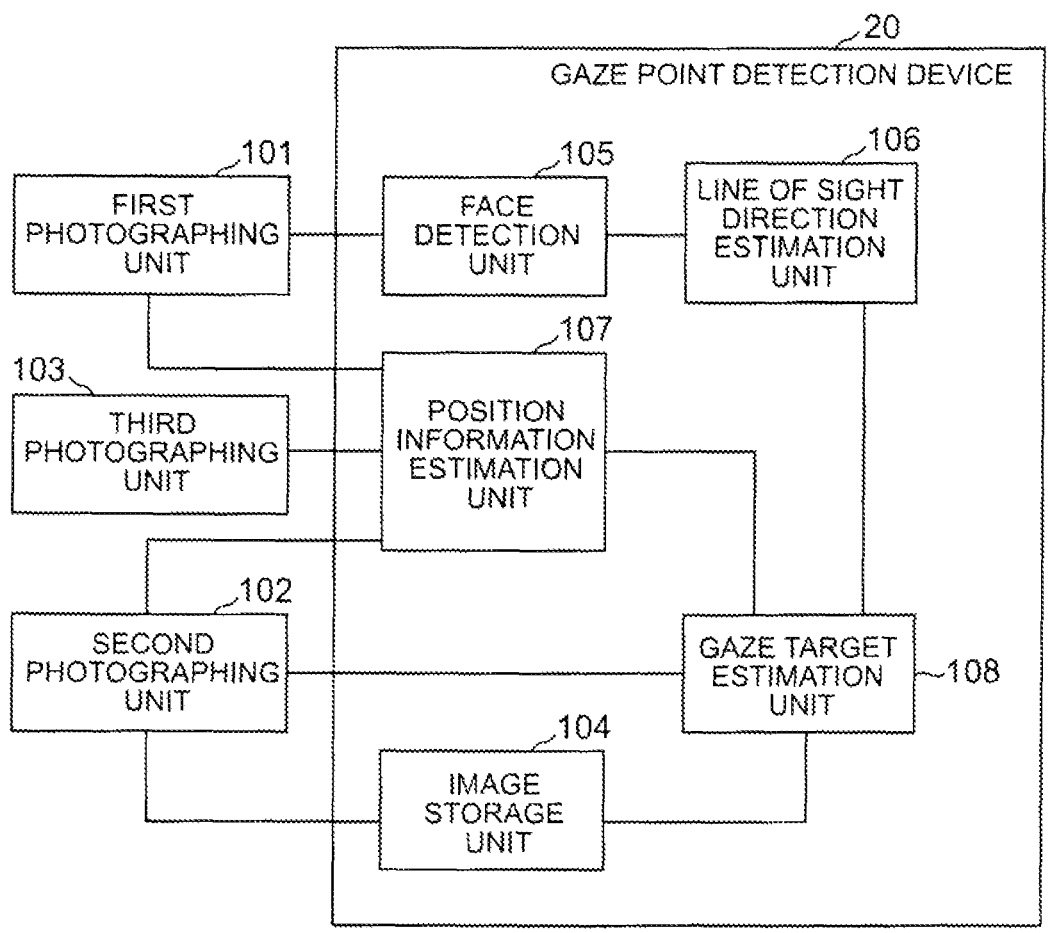
FIG. 6 It depicts a block diagram showing a configuration example of the gaze point detection device of the second example embodiment.

FIG. 6 is a block diagram showing a configuration example of the gaze point detection device 20 of the second example embodiment, together with the first photographing unit 101, the second photographing unit 102, and a third photographing unit 103. The gaze point detection device 20 is basically configured in the same manner as the gaze point detection device 10 of the first example embodiment, but in the present example embodiment, the position information estimation unit 107 also uses an image photographed by the third photographing unit 103. Note that a two-dimensional camera that does not obtain depth information may be used as the third photographing unit 103.

Figure 7:
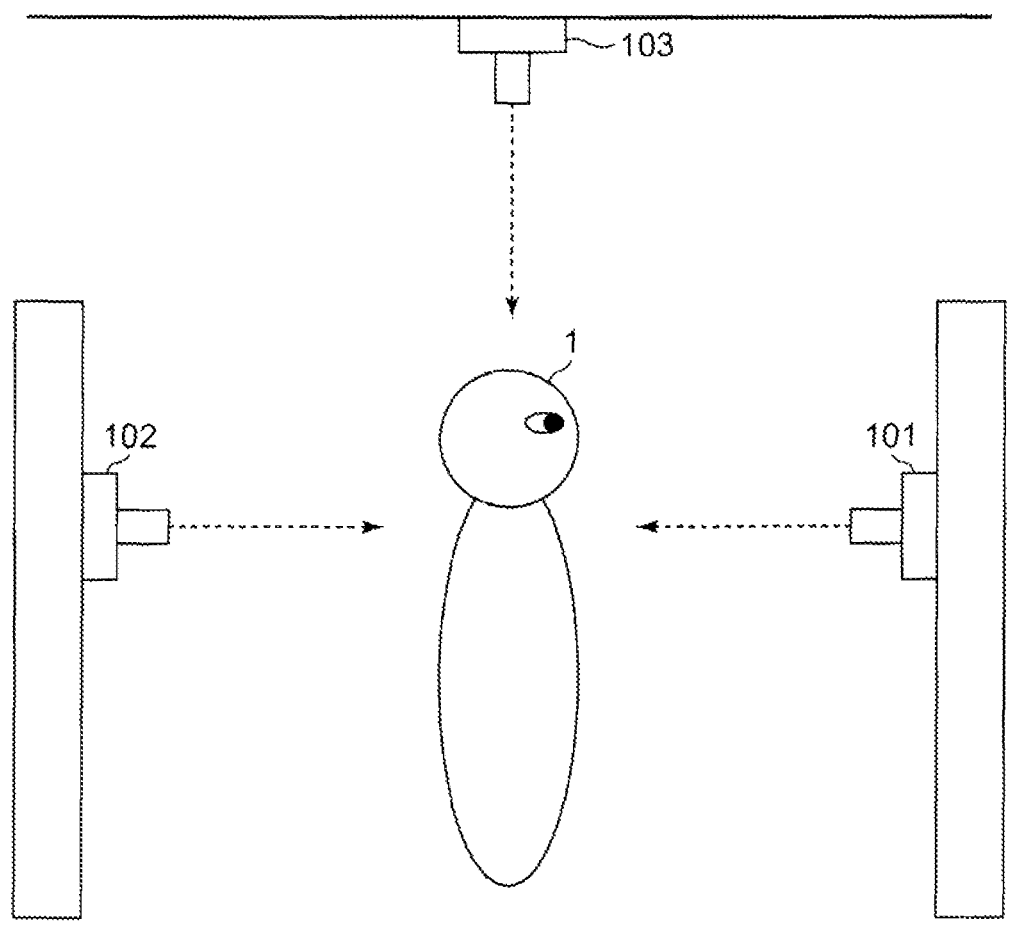
FIG. 7 It depicts an explanatory diagram showing a position example of a first photographing unit, a second photographing unit, and a third photographing unit.

FIG. 7 is an explanatory diagram showing a position example of the first photographing unit 101, the second photographing unit 102, and the third photographing unit 103.

As in the first example embodiment, the first photographing unit 101 is installed at a position such that a front side of an object person can be photographed when the object person is gazing at a certain object. The first photographing unit 101 is adjusted to a sufficient height or angle to allow the face of the person to be included in the image. Similarly, the second photographing unit 102 is installed so that the gaze portion to be detected, behind the first photographing unit 101, is included in the image. Further, the first photographing unit 101 and the second photographing unit 102 are installed so that no permanent obstructions or other objects include the photographed image.

The first photographing unit 101 is installed so that the second photographing unit 102 is within an image obtained by the first photographing unit 101. The second photographing unit 102 is installed so that the first photographing unit 101 is within an image obtained by the second photographing unit 102.

The first photographing unit 101 obtains an image (a two-dimensional image) including at least a portion of a face of the object person and the second photographing unit 102, and depth information. The second photographing unit 102 obtains an image including the object person, the first photographing unit 101 and a gaze target of the object person, and depth information. The image storage unit 104 records (stores) the image information photographed by the second photographing unit 102 and the depth information.

In the present example embodiment, the third photographing unit 103 is installed at a position where the first photographing unit 101, the second photographing unit 102, and the object person 1 can be photographed. The third photographing unit 103 photographs an image of the first photographing unit 101, the second photographing unit 102, and the object person 1, and may obtain their depth information.

Figure 8:
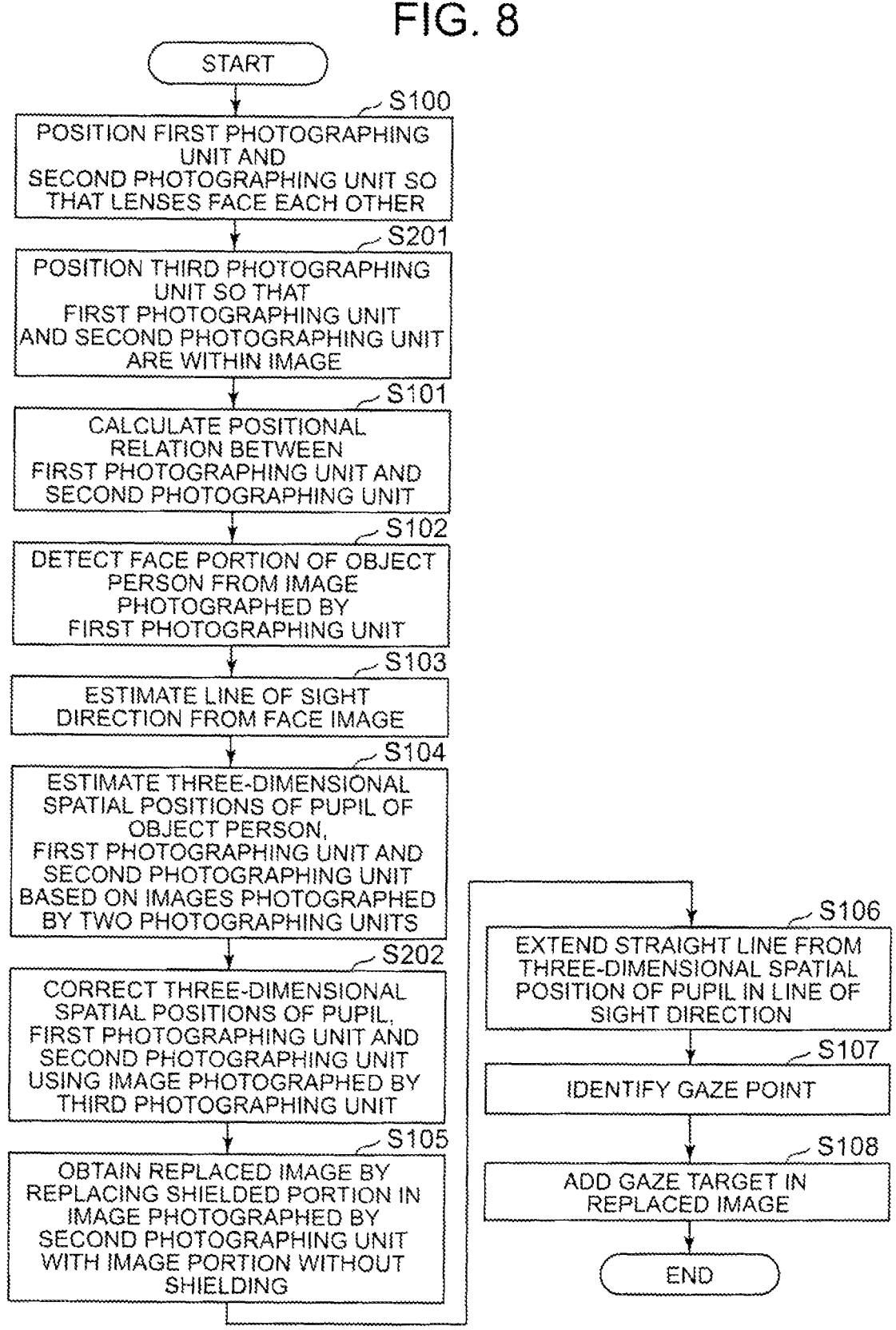
FIG. 8 It depicts a flowchart showing an operation of the gaze point detection device of the second example embodiment.

FIG. 8 is a flowchart showing an operation of the gaze point detection device 20 of the second example embodiment. In the flowchart shown in FIG. 8, the processing of steps S201 and S202 is added to the flowchart shown in FIG. 5.

As in the case of the first example embodiment, the first photographing unit 101 and the second photographing unit 102 in the gaze point detection device 10 are positioned so as to face each other (step S100). In addition, a third photographing unit 103 is installed at a position where the first photographing unit 101, the second photographing unit 102, and the object person 1 can be photographed (step S201). The processing of steps S101 to S103 is the same as the processing in the first example embodiment.

As in the case of the first example embodiment, the position information estimation unit 107 estimates the three-dimensional spatial positions of the pupil of the object person 1, the first photographing unit 101 and the second photographing unit 102 from the images photographed by the first photographing unit 101 and the second photographing unit 102 and the depth information (step S104), and then corrects the spatial positions (step S202).

In the processing of step S202, the position information estimation unit 107 corrects the position information estimated from the images photographed by the first photographing unit 101 and the second photographing unit 102 and the depth information using the image obtained from the third photographing unit 103.

Figure 9C:
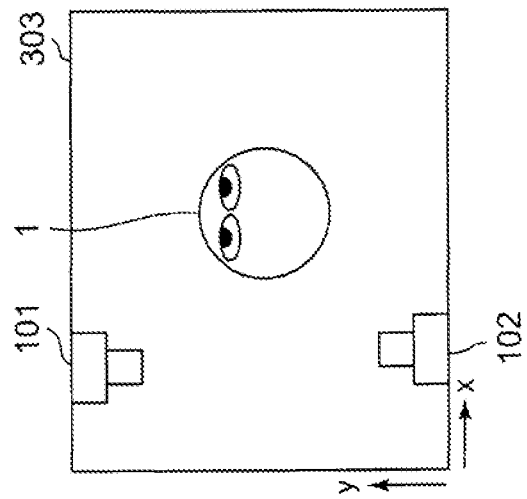
FIG. 9C It depicts an explanatory diagram showing an example of an image photographed by a third photographing unit.
Figure 9B:
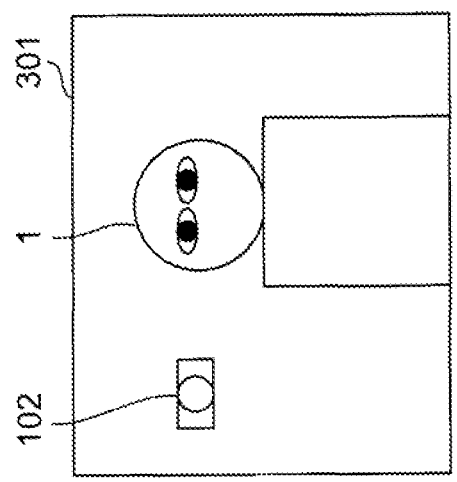
FIG. 9B It depicts an explanatory diagram showing an example of an image photographed by a first photographing unit.
Figure 9A:
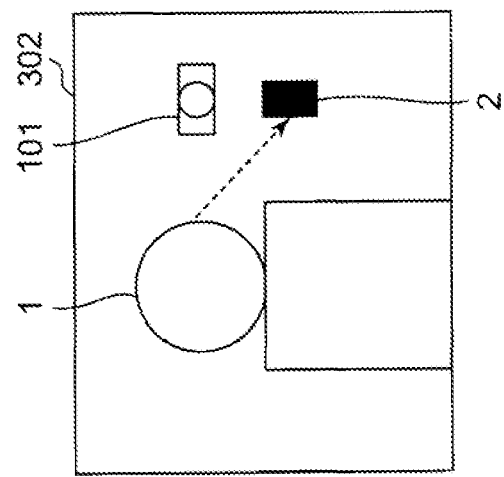
FIG. 9A It depicts an explanatory diagram showing an example of an image photographed by a second photographing unit.

FIGS. 9A to 9C are explanatory diagrams showing an example of images photographed by the first photographing unit 101, the second photographing unit 102, and the third photographing unit 103. FIG. 9A shows an example of an image 302 photographed by the second photographing unit 102, in which the object person 1, the gaze target 2, and the first photographing unit 101 are photographed. FIG. 9B shows an example of an image 301 photographed by the first photographing unit 101, in which the object person 1 and the second photographing unit 102 are photographed. FIG. 9C shows an example of an image 303 photographed by the third photographing unit 103, in which the object person 1, the first photographing unit 101, and the second photographing unit 102 are photographed.

The position information estimation unit 107 can obtain x-coordinate values and y-coordinate values of the object person 1, the first photographing unit 101, and the second photographing unit 102 in the image 303 (a two-dimensional screen in the xy plane). y-coordinate values correspond to the depth direction (z-direction) in the image 301 and the image 302. That is, they correspond to the depth information obtained by the first photographing unit 101 and the depth information obtained by the second photographing unit 102.

The x-coordinate values and the y-coordinate values in the image 303 are considered to be more reliable than the depth information obtained by the first photographing unit 101 and the depth information obtained by the second photographing unit 102, since they are coordinate values based on a directly photographed image. Therefore, in the processing of step S202, the position information estimation unit 107 replaces the z coordinate values among the values indicating the three-dimensional spatial positions of the pupil of the object person 1, the first photographing unit 101, and the second photographing unit 102 estimated in the processing of step S104 with the values in the image 303.

Thereafter, the processing of steps S105 to S108 are executed in the same manner as in the first example embodiment.

In the present example embodiment, the gaze point detection device 20 comprises, in addition to the first photographing unit 101 and the second photographing unit 102, the third photographing unit 103 that provides an image in which the first photographing unit 101 and the second photographing unit 102 and the object person 1 are photographed. The position information estimation unit 107 can obtain information of their spatial positions (in particular, information in the z-direction) from the first photographing unit 101, the second photographing unit 102, and the object person 1 directly obtained by the third photographing unit 103. Then, the position information estimation unit 107 corrects the three-dimensional spatial positions obtained from the depth information and the images obtained by the first photographing unit 101 and the second photographing unit 102 using the information obtained from the images by the third photographing unit 103. As a result, the gaze point detection device 20 can obtain an estimated value of the three-dimensional spatial positions with even higher accuracy. Therefore, the gaze point detection device 20 can identify the gaze target 2 with higher accuracy.

The gaze point detection devices 10, 20 of the above example embodiments are applicable to applications such as determining whether or not a customer is interested in a product from the gaze point in a commercial facility or the like. They are also applicable to applications such as determining what a suspicious person is interested in when performing suspicious behavior.

Example

Next, a specific example is described.

In this example, an application of a gaze point detection device 10, or a gaze point detection device 20 to a retail store is assumed. An RGB-D camera (the first RGB-D camera) is used as the first photographing unit 101, and an RGB-D camera (the second RGB-D camera) is used as the second photographing unit 102. The first RGB-D camera is, for example, installed at a customer aisle side in a product display shelf. The second RGB-D camera is, for example, installed across the customer aisle from the product display shelf on which the first photographing unit 101 is installed. The first RGB-D camera and the second RGB-D camera are each installed at approximately the same position in the product display shelf, where identical products of uniform standards are used as the product display shelf.

The internal parameters of the first RGB-D camera and the second RGB-D camera are obtained by appropriate calibration operations (for example, using OpenCV, etc.). Each product display shelf is aligned as parallel as possible. The distance between the product display shelves is set to be less than or equal to the distance at which the depth measurement errors of the first RGB-D camera and the second RGB-D camera are not too large. Practically, it is desirable to be installed so that the distance between the product display shelves does not exceed 3 meters. The closer the actual installation situations are to these distance conditions, the smaller the error in deriving the position and orientation of the camera from the information in the camera images.

Then, the respective positions of cameras are obtained from the images photographed by the first RGB-D camera and the second RGB-D camera. Then, for example, the rotation matrix R described above is derived.

Next, from the information obtained by the first RGB-D camera, the three-dimensional spatial position of the pupil of the object person 1 is estimated using a face detector as a face detection unit 105, for example, a face detection function of OpenCV. Further, the line of sight direction of the object person 1 is obtained by using a line of sight detector (for example, a corneal reflection method is used) as a line of sight direction estimation unit 106. A straight line is extended from the position of the pupil in the line of sight direction, and the intersection point with the lens plane (for example, z=0 plane) of the first RGB-D camera is obtained.

By combining this plane with the rotation matrix R, the lens plane of the first RGB-D camera can be represented by the coordinates of the second RGB-D camera. The obtained coordinate values in the second RGB-D camera are plotted on the image obtained by the second RGB-D camera. If the corresponding portion (gaze target 2) is shielded by the object person 1 or the like, the gaze target estimation unit 108 detects the gaze point in the image with the shielding removed, by using a past image photographed by the second RGB-D camera stored in the image storage unit 104 or a difference image in which the shielded portion is replaced by the corresponding portion in the past image.

The functions (processes) in each of the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 10:
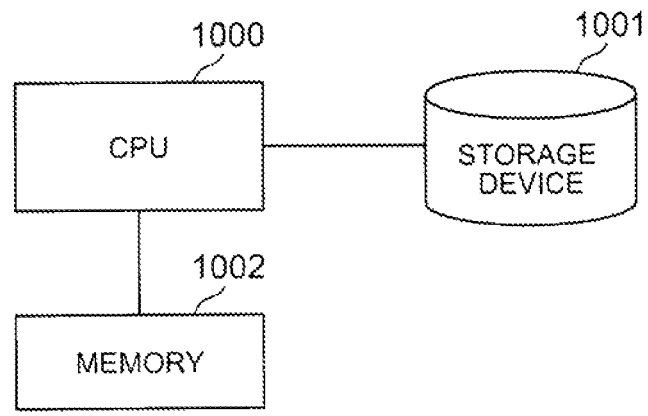
FIG. 10 It depicts a block diagram showing an example of a computer with a CPU.

FIG. 10 is a block diagram showing an example of a computer with a CPU. The computer is implemented in a gaze point detection device. The CPU 1000 executes processing in accordance with a program stored in a storage device 1001 to realize the functions in the above example embodiments. The computer realizes the functions of the face detection unit 105, the line of sight direction estimation unit 106, the position information estimation unit 107, and the gaze target estimation unit 108 in the gaze point detection devices 10, 20 shown in FIGS. 1 and 6.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk), magneto-optical storage media (for example, magneto-optical disc), compact disc-read only memory (CD-ROM), compact disc-recordable (CD-R), compact disc-rewritable (CD-R/W), and a semiconductor memory (for example, mask ROM, programmable ROM (PROM), erasable PROM (EPROM), flash ROM).

The program may be stored in various types of transitory computer readable media. The transitory computer readable medium is supplied with the program through, for example, a wired or wireless communication channel, or, via electric signals, optical signals, or electromagnetic waves.

The program may be stored in various types of transitory computer readable media. The transitory computer readable medium is supplied with the program through, for example, a wired or wireless communication channel, or, through electric signals, optical signals, or electromagnetic waves.

The image storage unit 104 shown in FIGS. 1 and 6 is realized by the storage device 1001 or the memory 1002.

Figure 11:
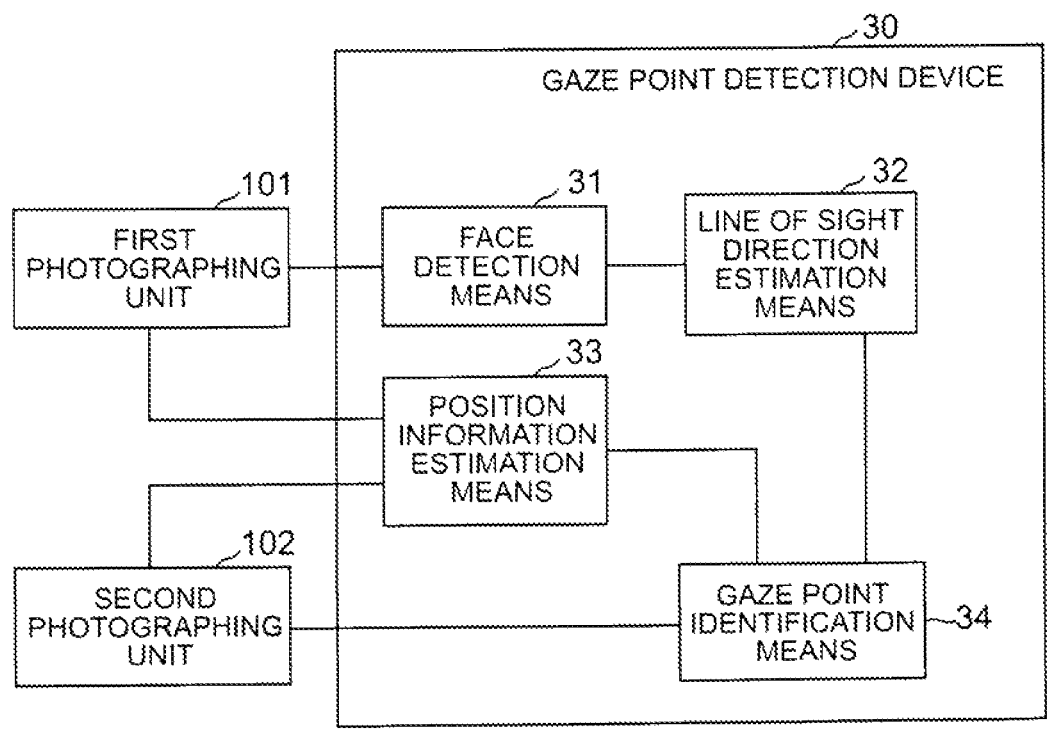
FIG. 11 It depicts a block diagram showing the main part of the gaze point detection device.

FIG. 11 is a block diagram showing the main part of the gaze point detection device according to the present invention. The gaze point detection device 30 shown in FIG. 11 comprises is a device which inputs a first image and first depth information obtained by a first photographing unit 101 that obtains at least an image of an area in which a second photographing unit 102 is included and depth information, and a second image and second depth information obtained by the second photographing unit 102 which is positioned opposite to the first photographing unit 101 and obtains at least an image of an area in which the first photographing unit 101 is included and depth information, wherein the device comprises face detection means 31 (in the example embodiments, realized by the face detection unit 105) for detecting a face portion of an object person from a first image and first depth information, line of sight direction estimation means 32 (in the example embodiments, realized by the line of sight direction estimation unit 106) for estimating a line of sight direction of the object person using the face portion detected by the face detecting means 31, position information estimation means 33 (in the example embodiments, realized by the position information estimation unit 107) for estimating a three-dimensional spatial position of a pupil of the object person and three-dimensional spatial positions of a first photographing unit and a second photographing unit, based on the first image, the first depth information, a second image and second depth information, and gaze point identification means 34 (in the example embodiments, realized by the gaze target estimation unit 108) for identifying a gaze point of the object person, based on the three-dimensional spatial position of the pupil of the object person and the line of sight direction.

A part of or all of the above example embodiments may also be described as, but not limited to, the following supplementary notes.

(Supplementary note 1) A gaze point detection device which inputs a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, wherein the gaze point detection device comprises:
  face detection means for detecting a face portion of an object person from the first image and the first depth information,
  line of sight direction estimation means for estimating a line of sight direction of the object person using the face portion detected by the face detecting means,
  position information estimation means for estimating a three-dimensional spatial position of a pupil of the object person and three-dimensional spatial positions of the first photographing unit and the second photographing unit, based on the first image, the first depth information, the second image and the second depth information, and
  gaze point identification means for identifying a gaze point of the object person, based on the three-dimensional spatial position of the pupil of the object person and the line of sight direction.

(Supplementary note 2) The gaze point detection device according to Supplementary note 1, wherein
  the gaze point identification means displays the gaze point of the object person in the image photographed by the second photographing unit.

(Supplementary note 3) The gaze point detection device according to Supplementary note 1 or 2, wherein
  the face detection means obtains an image including a front side of the object person as the first image, and
  the position information estimation means obtains an image including the front side of the object person as the first image and an image including a back side of the object person as the second image.

(Supplementary note 4) The gaze point detection device according to any one of Supplementary notes 1 to 3, wherein
  the position information estimation means calculates a rotation matrix that relates the position of the first photographing unit in the second image to the position of the second photographing unit in the first image.

(Supplementary note 5) The gaze point detection device according to any one of Supplementary notes 1 to 4, wherein the position information estimation means corrects the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

(Supplementary note 6) A gaze point detection method comprising:
　inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information,
　detecting a face portion of an object person from the first image and the first depth information,
　estimating a line of sight direction of the object person using the detected face portion,
　estimating a three-dimensional spatial position of a pupil of the object person and three-dimensional spatial positions of the first photographing unit and the second photographing unit, based on the first image, the first depth information, the second image and the second depth information, and
　identifying a gaze point of the object person, based on the three-dimensional spatial position of the pupil of the object person and the line of sight direction.

(Supplementary note 7) The gaze point detection method according to Supplementary note 6, further comprising
　displaying the gaze point of the object person in the image photographed by the second photographing unit.

(Supplementary note 8) The gaze point detection method according to Supplementary note 6 to 7, further comprising
　calculating a rotation matrix that relates the position of the first photographing unit in the second image to the position of the second photographing unit in the first image.

(Supplementary note 9) The gaze point detection method according to any one of Supplementary notes 6 to 8, further comprising
　correcting the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

(Supplementary note 10) A computer-readable information recording medium storing a gaze point detection program, when executed by a processor, performing:
　a process of inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information,
　a process of detecting a face portion of an object person from the first image and the first depth information,
　a process of estimating a line of sight direction of the object person using the detected face portion,
　a process of estimating a three-dimensional spatial position of a pupil of the object person and three-dimensional spatial positions of the first photographing unit and the second photographing unit, based on the first image, the first depth information, the second image and the second depth information, and
　a process of identifying a gaze point of the object person, based on the three-dimensional spatial position of the pupil of the object person and the line of sight direction.

(Supplementary note 11) The information recording medium according to Supplementary note 10, wherein the gaze point detection program, when executed by the processor, further performs
　a process of displaying the gaze point of the object person in the image photographed by the second photographing unit.

(Supplementary note 12) The information recording medium according to Supplementary note 10 or 11, wherein the gaze point detection program, when executed by the processor, further performs
　a process of calculating a rotation matrix that relates the position of the first photographing unit in the second image to the position of the second photographing unit in the first image.

(Supplementary note 13) The information recording medium according to any one of Supplementary notes 10 to 12, wherein the gaze point detection program, when executed by the processor, further performs
　a process of correcting the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

(Supplementary note 14) A gaze point detection program causes a computer to execute:
　a process of inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information,
　a process of detecting a face portion of an object person from the first image and the first depth information,
　a process of estimating a line of sight direction of the object person using the detected face portion,
　a process of estimating a three-dimensional spatial position of a pupil of the object person and three-dimensional spatial positions of the first photographing unit and the second photographing unit, based on the first image, the first depth information, the second image and the second depth information, and
　a process of identifying a gaze point of the object person, based on the three-dimensional spatial position of the pupil of the object person and the line of sight direction.

(Supplementary note 15) The gaze point detection program according to Supplementary note 14, wherein the imaging program causes the computer to further execute a process of displaying the gaze point of the object person in the image photographed by the second photographing unit.

(Supplementary note 16) The gaze point detection program according to Supplementary note 14 or 15, wherein the imaging program causes the computer to further execute
a process of calculating a rotation matrix that relates the position of the first photographing unit in the second image to the position of the second photographing unit in the first image.

(Supplementary note 17) The gaze point detection program according to any one of Supplementary notes 14 to 16, wherein the imaging program causes the computer to further execute
a process of correcting the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

(Supplementary note 18) A gaze point detection system comprising a first photographing unit and a second photographing unit, wherein
the first photographing unit obtains at least an image of an area in which a second photographing unit is included and depth information,
the second photographing unit is positioned opposite to the first photographing unit and obtains at least an image of an area in which the first photographing unit is included and depth information, and
wherein the gaze point detection system comprises:
face detection means for detecting a face portion of an object person from the first image and the first depth information,
line of sight direction estimation means for estimating a line of sight direction of the object person using the face portion detected by the face detecting means,
position information estimation means for estimating a three-dimensional spatial position of a pupil of the object person and three-dimensional spatial positions of the first photographing unit and the second photographing unit, based on the first image, the first depth information, the second image and the second depth information, and
gaze point identification means for identifying a gaze point of the object person, based on the three-dimensional spatial position of the pupil of the object person and the line of sight direction.

(Supplementary note 19) The gaze point detection system according to Supplementary note 18, wherein
the gaze point identification means displays the gaze point of the object person in the image photographed by the second photographing unit.

(Supplementary note 20) The gaze point detection system according to Supplementary note 18 or 19, wherein
the face detection means obtains an image including a front side of the object person as the first image, and
the position information estimation means obtains an image including the front side of the object person as the first image and an image including a back side of the object person as the second image.

(Supplementary note 21) The gaze point detection system according to any one of Supplementary notes 18 to 20, wherein
the position information estimation means calculates a rotation matrix that relates the position of the first photographing unit in the second image to the position of the second photographing unit in the first image.

(Supplementary note 22) The gaze point detection system according to any one of Supplementary notes 18 to 21, further comprising
a third photographing unit that is installed to be able to photograph an image of an area in which at least the first photographing unit and the second photographing unit are included, wherein
the position information estimation means corrects the three-dimensional spatial position of the pupil of the object person and the three-dimensional spatial positions of the first photographing unit and the second photographing unit, based on a third image obtained by the third photographing unit.

While the present invention has been explained with reference to the example embodiments, the present invention is not limited to the aforementioned example embodiments. Various changes understandable to those skilled in the art within the scope of the present invention can be made to the structures and details of the present invention.

REFERENCE SIGNS LIST

1 Object person
2 Gaze target
10, 20, 30 Gaze point detection device
31 Face detection means
32 Line of sight direction estimation means
33 Position information estimation means
34 Gaze point identification means
101 First photographing unit
102 Second photographing unit
103 Third photographing unit
104 Image storage unit
105 Face detection unit
106 Line of sight direction estimation unit
107 Position information estimation unit
108 Gaze target estimation unit
1000 CPU
1001 Storage device
1002 Memory

What is claimed is:

1. A gaze point detection device which inputs a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, wherein the gaze point detection device comprises:
a memory configured to store instructions;
at least one processor configured to execute the instructions to:
detect a face portion of an object person from the first image and the first depth information,
estimate a line of sight direction of the object person using the face portion detected by the face detecting means,
estimate a three-dimensional spatial position of a pupil of the object person and three-dimensional spatial positions of the first photographing unit and the second photographing unit, based on the first image, the first depth information, the second image and the second depth information, and identify a gaze point of the object person, based on the three-dimensional spatial position of the pupil of the object person and the line of sight direction.

2. The gaze point detection device according to claim 1, wherein the at least one processor further configured to execute the instructions to display the gaze point of the object person in the image photographed by the second photographing unit.

3. The gaze point detection device according to claim 1, wherein the at least one processor further configured to execute the instructions to obtain an image including a front side of the object person as the first image, and obtain an image including the front side of the object person as the first image and an image including a back side of the object person as the second image.

4. The gaze point detection device according to claim 1, wherein the at least one processor further configured to execute the instructions to calculate a rotation matrix that relates the position of the first photographing unit in the second image to the position of the second photographing unit in the first image.

5. The gaze point detection device according to claim 1, wherein the at least one processor further configured to execute the instructions to correct the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

6. A gaze point detection method comprising:

inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, detecting a face portion of an object person from the first image and the first depth information, estimating a line of sight direction of the object person using the detected face portion, estimating a three-dimensional spatial position of a pupil of the object person and three-dimensional spatial positions of the first photographing unit and the second photographing unit, based on the first image, the first depth information, the second image and the second depth information, and identifying a gaze point of the object person, based on the three-dimensional spatial position of the pupil of the object person and the line of sight direction.

7. The gaze point detection method according to claim 6, further comprising displaying the gaze point of the object person in the image photographed by the second photographing unit.

8. The gaze point detection method according to claim 6, further comprising calculating a rotation matrix that relates the position of the first photographing unit in the second image to the position of the second photographing unit in the first image.

9. The gaze point detection method according to claim 6, further comprising correcting the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

10. A non-transitory computer-readable information recording medium storing a gaze point detection program, when executed by a processor, performing:

inputting a first image and first depth information obtained by a first photographing unit that obtains at least an image of an area in which a second photographing unit is included and depth information, and a second image and second depth information obtained by the second photographing unit which is positioned opposite to the first photographing unit and obtains at least an image of an area in which the first photographing unit is included and depth information, detecting a face portion of an object person from the first image and the first depth information, estimating a line of sight direction of the object person using the detected face portion, estimating a three-dimensional spatial position of a pupil of the object person and three-dimensional spatial positions of the first photographing unit and the second photographing unit, based on the first image, the first depth information, the second image and the second depth information, and identifying a gaze point of the object person, based on the three-dimensional spatial position of the pupil of the object person and the line of sight direction.

11. The information recording medium according to claim 10, wherein the gaze point detection program, when executed by the processor, further performs displaying the gaze point of the object person in the image photographed by the second photographing unit.

12. The information recording medium according to claim 10, wherein the gaze point detection program, when executed by the processor, further performs calculating a rotation matrix that relates the position of the first photographing unit in the second image to the position of the second photographing unit in the first image.

13. The information recording medium according to claim 10, wherein the gaze point detection program, when executed by the processor, further performs correcting the three-dimensional spatial position of the pupil of the object person and the three-dimensional spatial positions of the first photographing unit and the second photographing unit, based on a third image obtained by a third photographing unit that is installed to be able to photograph an image of an area in which at least the first photographing unit and the second photographing unit are included.

* * * * *